(12) United States Patent
Cragun et al.

(10) Patent No.: US 8,405,623 B2
(45) Date of Patent: Mar. 26, 2013

(54) DIRECTIONAL AUDIO VIEWPORT FOR THE SIGHT IMPAIRED IN VIRTUAL WORLDS

(75) Inventors: Brian J. Cragun, Rochester, MN (US); Zachary A. Garbow, Rochester, MN (US); Christopher A. Peterson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 12/410,703

(22) Filed: Mar. 25, 2009

(65) Prior Publication Data

US 2010/0245257 A1 Sep. 30, 2010

(51) Int. Cl.
*G06F 3/041* (2006.01)
*G06F 3/16* (2006.01)
*G06F 3/048* (2006.01)

(52) U.S. Cl. ....................................... 345/173

(58) Field of Classification Search .................. 345/173; 715/729, 757
See application file for complete search history.

(56) References Cited

U.S. PATENT DOCUMENTS

| 6,219,045 B1 * | 4/2001 | Leahy et al. ............ 715/757 |
| 2006/0082689 A1 * | 4/2006 | Moldvai ................. 348/678 |
| 2007/0198178 A1 * | 8/2007 | Trimby et al. ........... 701/209 |
| 2007/0219645 A1 * | 9/2007 | Thomas et al. .......... 700/29 |

\* cited by examiner

*Primary Examiner* — Hoa T Nguyen
*Assistant Examiner* — Andrew Sasinowski
(74) *Attorney, Agent, or Firm* — Patterson & Sheridan LLP (57) ABSTRACT

Embodiments of the invention provide techniques for presenting a virtual world to sight-impaired users. In one embodiment, the user may indicate an area of focus within the virtual world. The user may then be provided with audio descriptions of objects or avatars included within the area of focus. The descriptions may be provided at varying levels of detail, enabling the user to "zoom in" on particular items of interest. Further, the user may select an audio description to navigate an avatar to the location of the corresponding object.

21 Claims, 5 Drawing Sheets

DIRECTIONAL AUDIO VIEWPORT FOR THE SIGHT IMPAIRED IN VIRTUAL WORLDS

BACKGROUND OF THE INVENTION

1. Field of the Invention

The field of the invention relates to immersive virtual environment presentation, specifically to directional cues to help sight impaired user of an immersive virtual environment.

2. Description of the Related Art

A virtual world is a simulated environment in which users may inhabit and interact with one another via avatars. Users may also interact with virtual objects and locations of the virtual world. An avatar generally provides a graphical representation of an individual within the virtual world environment. Avatars are usually presented to other users as two or three-dimensional graphical representations of humanoids. Frequently, virtual worlds allow for multiple users to enter and interact with one another.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or multi-user environments, the virtual world continues to exist, and plots and events continue to occur as users enter (and exit) the virtual world.

Virtual worlds provide an immersive environment as they typically appear similar to the real world, with real world rules such as gravity, topography, locomotion, real-time actions, and communication. Presentation of the virtual world may include visual data, auditory data, and other types of sensory data. Communication may be in the form of text messages sent between avatars, but may also include real-time voice communication.

SUMMARY OF THE INVENTION

One embodiment of the invention includes a computer-implemented method. The method generally includes: presenting a user with a selection viewport in a user interface, wherein the selection viewport represents a partial view of a virtual environment from a perspective of an avatar present at a first location within the virtual environment, and wherein the virtual environment comprises a plurality of elements, the plurality of elements being organized hierarchically into a plurality of levels of detail; receiving a user interaction with the user interface; based on the user interaction, determining an audio viewport, wherein the audio viewport is a portion of the selection viewport from which the user can select elements for which audio descriptions are desired; identifying one or more elements included in the audio viewport; determining at least one element, of the one or more elements, that satisfies one or more predefined user preferences for elements to be described; and providing the user with audio descriptions of the determined at least one element.

Another embodiment of the invention includes a computer-readable storage medium containing a program, which when executed on a processor performs an operation. The operation may generally include: presenting a user with a selection viewport in a user interface, wherein the selection viewport represents a partial view of a virtual environment from a perspective of an avatar present at a first location within the virtual environment, and wherein the virtual environment comprises a plurality of elements, the plurality of elements being organized hierarchically into a plurality of levels of detail; receiving a user interaction with the user interface; based on the user interaction, determining an audio viewport, wherein the audio viewport is a portion of the selection viewport from which the user can select elements for which audio descriptions are desired; identifying one or more elements included in the audio viewport; determining at least one element, of the one or more elements, that satisfies one or more predefined user preferences for elements to be described; and providing the user with audio descriptions of the determined at least one element.

Still another embodiment of the invention includes a system having a processor and a memory containing a program, which when executed by the processor is configured to perform an operation. The operation may generally include: presenting a user with a selection viewport in a user interface, wherein the selection viewport represents a partial view of a virtual environment from a perspective of an avatar present at a first location within the virtual environment, and wherein the virtual environment comprises a plurality of elements, the plurality of elements being organized hierarchically into a plurality of levels of detail; receiving a user interaction with the user interface; based on the user interaction, determining an audio viewport, wherein the audio viewport is a portion of the selection viewport from which the user can select elements for which audio descriptions are desired; identifying one or more elements included in the audio viewport; determining at least one element, of the one or more elements, that satisfies one or more predefined user preferences for elements to be described; and providing the user with audio descriptions of the determined at least one element.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide techniques for presenting a virtual world to sight-impaired users. In one embodiment, the user may indicate an area of focus within the virtual world. The user may then be provided with audio descriptions of objects or avatars included within the area of focus. The descriptions may be provided at varying levels of detail, enabling the user to "zoom in" on particular items of interest. Further, the user may select an audio description to navigate an avatar to the location of the corresponding object.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
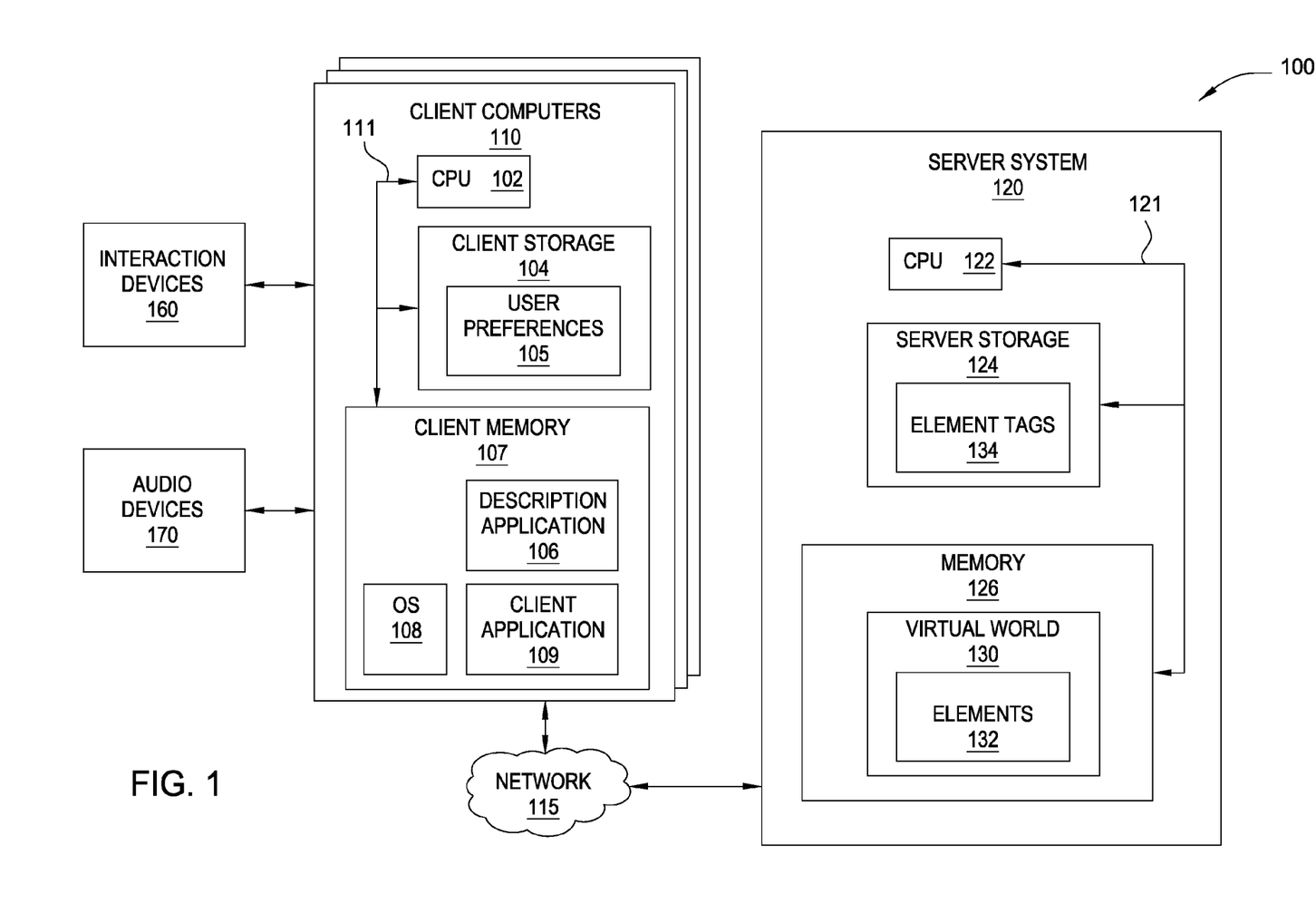
FIG. 1 is a block diagram that illustrates a client server view of an exemplary computing environment, according to one embodiment of the invention.

FIG. 1 is a block diagram that illustrates a client server view of computing environment 100, according to one embodiment of the invention. As shown, computing environment 100 includes client computers 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, server system 120 includes a CPU 122, which obtains instructions and data via a bus 121 from memory 126 and server storage 124. The CPU 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). Server storage 124 may represent hard-disk drives, flash memory devices, optical media and the like. In addition, memory 126 and storage 124 may be considered to include memory physically located elsewhere in a server 120, for example, on another computer coupled to the server 120 via bus 121. Server 120 may be operably connected to the network 115, which generally represents any kind of data communications network. Accordingly, the network 115 may represent both local and wide area networks, including the Internet.

Memory 126 includes virtual world 130. In one embodiment, virtual world 130 may be a software application that allows a user to explore and interact with an immersive virtual environment. Illustratively, virtual world 130 includes elements 132. The elements 132 may be virtual representations of objects, locations, structures, and the like. Further, the elements 132 may be described by element tags 134. In one embodiment, the element tags 134 may be metadata (e.g., XML metadata) included in the server storage 124.

As shown, each client computer 110 includes a central processing unit (CPU) 102, which obtains instructions and data via a bus 111 from client memory 107 and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. Client computer 110 is operably connected to the network 115.

Client memory 107 includes an operating system (OS) 108, a description application 106 and a client application 109. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, the client application 109 provides a software program that allows a user to connect to a virtual world 130, and once connected, to perform various user actions. Such actions may include exploring virtual locations, interacting with other avatars, and interacting with elements 132. Further, client application 109 may be configured to generate and display a visual representation of the user within the immersive environment, generally referred to as an avatar. The avatar of the user is generally visible to other users in the virtual world, and the user may view avatars representing the other users. Furthermore, the client application 109 may also be configured to present the immersive environment to the user and to transmit the user's desired actions to virtual world 130 on server 120.

In one embodiment, the description application 106 may be configured to generate audio descriptions, meaning speech or sound output describing the elements 132 of the virtual world 154. Such audio descriptions may be used, e.g., to allow a user with a visual impairment to experience the virtual world 130 through sound rather instead of sight. For example, audio descriptions may be presented to a user by a synthetic or recorded voice speaking a description of an element 132 (e.g., "red car," "large tree," "house," etc.). Further, the audio descriptions may be provided by playing sounds that are characteristic of a given element 132 (e.g., engine noise for a "car" element, barking for a "dog" element, etc.), and thus serve to describe the element 132. The audio descriptions may be stored in the element tags 134 stored in the server storage 124, and may include text data, sound data, descriptive metadata, and the like. In one embodiment, the stored audio descriptions may be converted to a user's preferred output format. For example, an audio description may be stored as text, and may be output in the form of a synthetic voice.

In one embodiment, the description application 106 may be configured to present audio descriptions according to characteristics of the element 132 being described. For example, the volume or pitch used to present an audio description of an element 132 may reflect the size of the element 132, the proximity of the element 132 to the user's avatar, whether the element 132 is moving, and the like. Further, the volume or pitch used to present an audio description of an avatar may reflect whether the avatar is known to the user.

In one embodiment, the description application 106 may only describe elements 132 that are within an area of focus, meaning a portion of the virtual world in proximity to the user's avatar. Generally, such an area of focus may be thought of as being analogous to a viewport, meaning the limited portion of the virtual world 130 visible to a person or avatar from a given virtual location. Thus, the area of focus of the description application 106 is hereinafter referred to as an "audio viewport." Examples of audio viewports are discussed below with reference to FIGS. 2A-2C.

As shown, client storage 104 may include user preferences 105. In one embodiment, user preferences 105 may specify characteristics for the audio descriptions provided to a user of a particular client 110. Generally, when a user is interacting with the virtual world 130, the user may find that being presented with a large number of audio descriptions is overwhelming. In particular, the user may wish to ignore audio descriptions of unimportant elements 132, meaning any elements 132 that are unnecessary for the user to be aware of in understanding a given location within a virtual environment. Accordingly, the user may specify criteria or preferences within the user preferences 105 to identify (and limit) the characteristics of the audio descriptions that the user desires to be provided with.

In one embodiment, the user preferences 105 may specify a preferred level of detail of elements 132 to be included in the audio viewport. Generally, elements 132 may be composed of hierarchical levels of smaller elements 132 (referred to herein as "sub-elements"). For example, a "car" element may be composed of sub-elements such as "wheels," "engine," "seats," and so on. Further, the "engine" element may be composed of sub-elements such as "pistons," "sparkplugs," and so on. Thus, the user preferences 105 may specify that the user would like to only be presented, e.g., with a particular level (or levels) of elements 132 included in the audio viewport, with elements 132 above a minimum level of detail, and the like. The user preferences 105 may also specify a preferred number of elements 132 to be described in a given audio viewport. For example, the user preferences 105 may specify that the user only wishes to hear audio descriptions of ten elements 132 included found within the audio viewport.

Further, the user preferences 105 may specify time-related characteristics of the audio descriptions. Such time-related characteristics may include, e.g., the rate at which the audio descriptions of the elements included in an audio viewport are presented to the user by the description application 106, the length of pause in between each audio description, etc. For example, the user preferences 105 may specify a pause of two seconds between each audio description. Furthermore, the user preferences 105 may specify that particular elements 132 should be filtered, meaning those elements 132 will not be described by the description application 106. Such filtering may be performed on the basis of any criteria specified by the user, such as the type of element (e.g., filter elements of type "animal"), interest to the user (e.g., don't filter "house" elements), familiarity (e.g., don't filter the avatars representing friends), and the like.

In one embodiment, user preferences 105 may be manually entered and/or edited by the user. For example, the client application 109 may provide the user with a configuration interface (not shown) for manually editing the user preferences 105. In another embodiment, user preferences 105 may be based on system settings configured by an administrator of the virtual world 130. In yet another embodiment, the client application 109 may be configured to automatically determine the user preferences 105 based on the user's interactions with the client application 109. For example, if the user performs a command to repeat the audio descriptions multiple times, the client application 109 may adjust the user preferences 105 such that the audio descriptions are presented at a slower rate, are presented with longer pauses in between each audio description, and the like.

In one embodiment, the user may specify an audio viewport by interacting with the description application 106 through the interaction devices 160. Such interaction devices may include a touch screen, a pen tablet, motion-sensitive gloves, and the like. In response, the audio descriptions generated by the description application 106 may be provided to the user by audio output devices 170, which may represent, e.g., a sound synthesizer, computer speakers, headphones, and the like.

Of course, the embodiments described above are intended to be illustrative, and are not limiting of the invention. Other embodiments are broadly contemplated. For example, user preferences 105 may be stored on server 120, rather than on client computer 110. In another example, the client application 109 and/or the description application 106 may be replaced by separate components, such as a component resident on the client computer 110, a component resident on the server 120, etc. Further, the invention may be adapted for use with a variety of input or output devices configured to present the virtual world to the user and to translate movement/motion or other actions of the user into actions performed by the avatar representing that user within the virtual world 130.

Figure 2A:
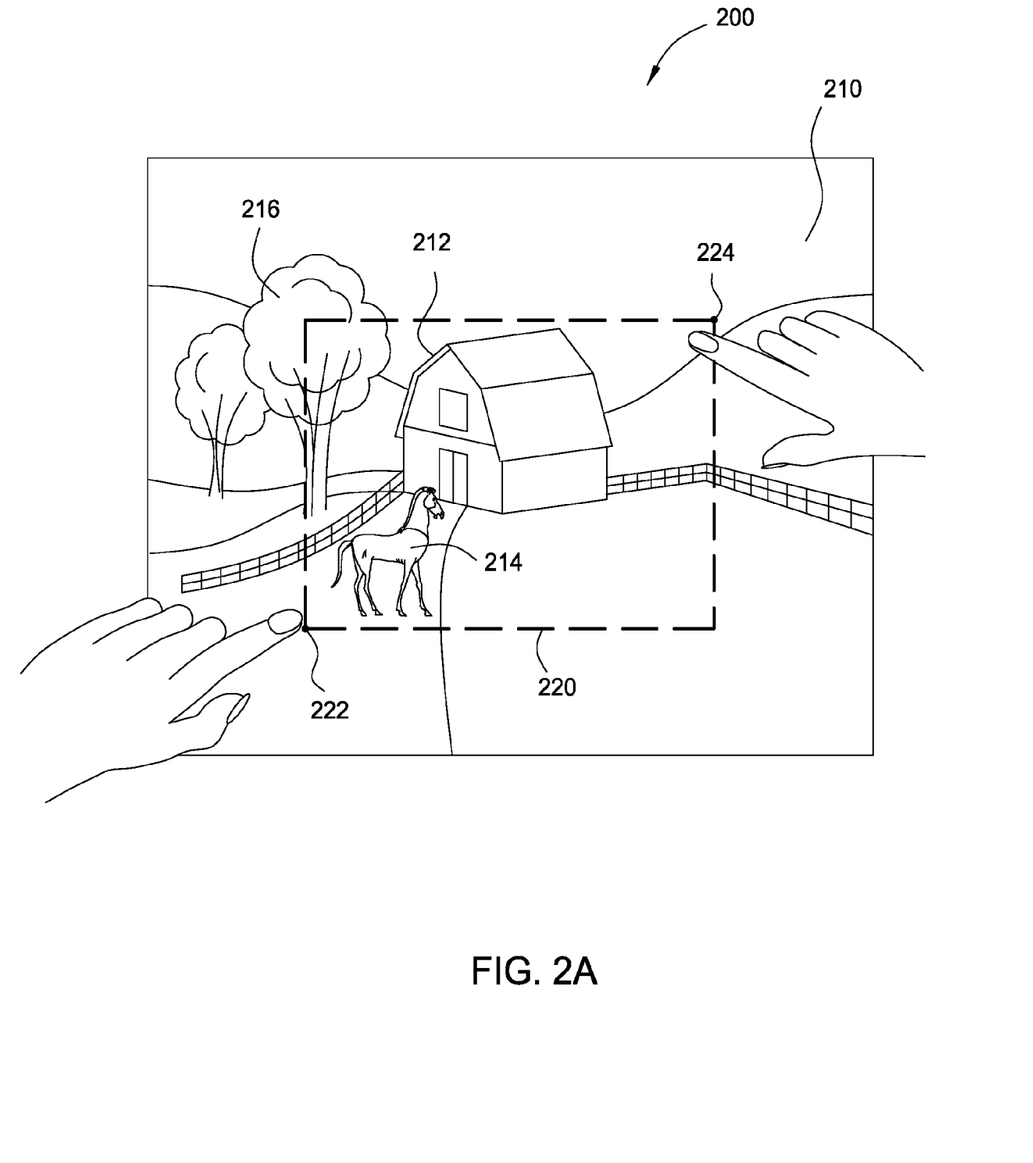
FIGS. 2A-2C illustrate user displays configured for use of an audio viewport, according to one embodiment of the invention.
Figure 2B:
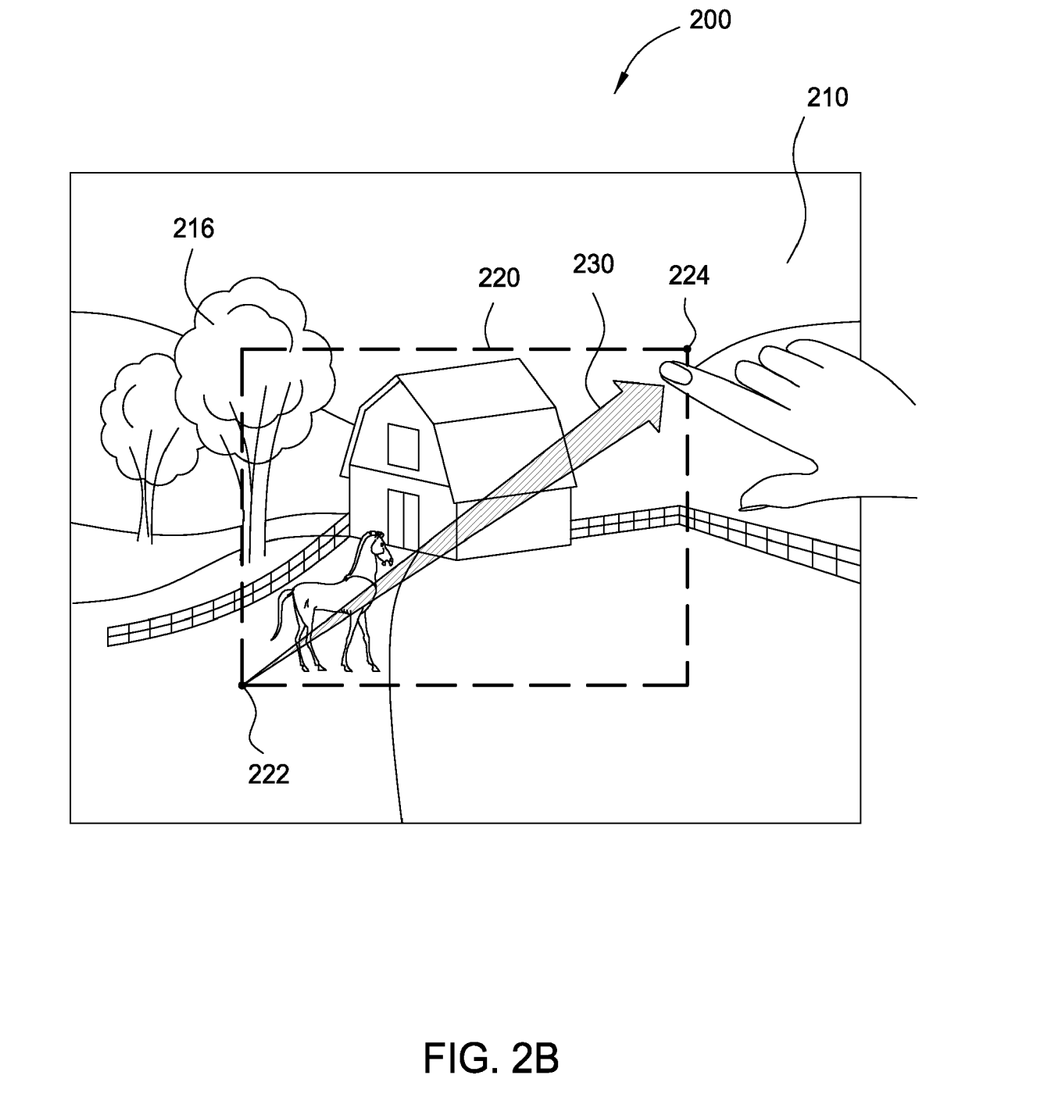
Figure 2C:
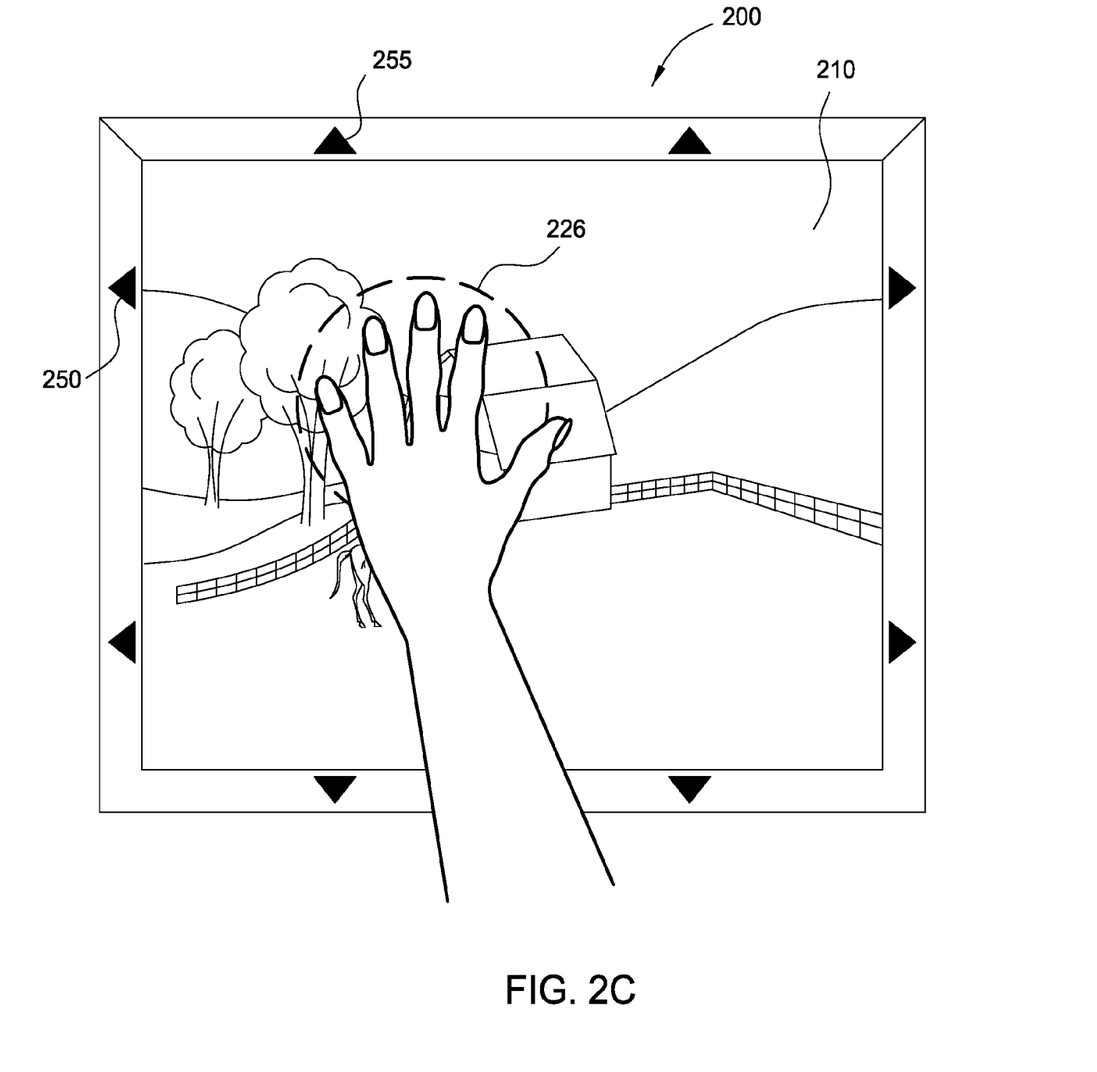

FIGS. 2A-2C illustrate exemplary techniques for specifying an audio viewport through the interaction devices 160. In one embodiment, the user may specify an audio viewport by selecting a portion of a larger viewport. Such a larger viewport is hereinafter referred to a "selection viewport." The selection viewport may represent a partial view of the virtual world 130 from a first-person perspective corresponding to an avatar.

FIG. 2A illustrates a user interface 200 that is configured as a touch-sensitive screen, and which represents one type of interaction device 160 for interacting with virtual world 130. In this example, the user interface 200 is shown as displaying a selection viewport 210, represented as an image of a farm location, including a barn 212, horse 214 and trees 216. While all the details of an actual image within the user interface 200 (as shown in FIG. 2A) may be of lesser use to some sight-impaired users, it still provides important spatial orientation for the objects in relation to each other and the location of the viewer. The image is shown in this example illustrates the selection viewport 210, meaning the portion of virtual world that is available to the user for making a selection of an audio viewport. Even so, in an actual implementation, displaying an actual image of the selection viewport 210 may be optional, depending on a specific use for which the user interface 200 is adapted.

As shown in FIG. 2A, the user may touch the user interface 200 at a first point 222 and a second point 224. In this example, the user is touching the user interface 200 with the right and left index fingers. Optionally, the user may also touch the user interface with the fingers of a single hand (e.g., thumb and index finger). The points 222, 224 may indicate, respectively, the lower-left and upper-right corners of a rectangle 220 (shown by a dotted line). In one embodiment, the rectangle 220 may define an audio viewport for the description application 106. That is, the rectangle 220 represents a user selection of the portion of the selection viewport 210 to be used as an area of focus for audio descriptions. Thus, the description application 106 may provide audio descriptions of the elements present within the rectangle 220, such the horse 214 and the barn 212. Note that the rectangle 220 is provided to illustrate a user selection of an audio viewport. Of course, a user selection of an audio viewport may be performed with any geometric shape, such as a circle, an oval, a square, etc. Thus, any of these variations may be considered to be within the scope of the invention. In one embodiment, the description application 106 may verbalize the physical orientation of the user selection. For example, referring to the rectangle 220 shown in FIG. 2A, the description application 106 may provide the following verbal description: "Selection area of 6 inches by 4 inches starting at coordinates of 2 inches and 2 inches." Of course, other nomenclatures for describing the selection area may be used, such as the absolute position, the direction being looked at, the zoom level of the view, etc. In another embodiment, the user is allowed to reset the viewport to its widest view. In other words, the user can go back to the widest zoom.

In one embodiment, the description application 106 may provide audio descriptions of any elements that are partially included in the selected audio viewport (e.g., rectangle 220). That is, if the border of the audio viewport cuts through an element 132 included in the selection viewport 210 (e.g., the tree 216 shown in FIG. 2A), that element 132 may be considered to be fully within the audio viewport, and is thus described by the description application 106. In another embodiment, the description application 106 may only provide audio descriptions of elements that are completely contained within the audio viewport. For example, since the tree 216 is not completely included in the rectangle 220, it would not be described by the description application 106. Optionally, the description application 106 may be configured to include or exclude an element 132 from the audio viewport based on whether the portion of the element 132 included within the audio viewport meets a predefined threshold. For example, the description application 106 may be configured to describe an element 132 only if at least half of the element 132 is contained within the rectangle 220.

FIG. 2B illustrates a second exemplary technique for specifying an audio viewport using the user interface 200. In this example, the user touches the user interface 200 in a diagonal swiping motion (indicated by the arrow 230) between the first point 222 and the second point 224. Again, the two points 222, 224 may be used to indicate diagonally-opposed corners of the rectangle 220, thus defining the audio viewport for the description application 106.

FIG. 2C illustrates a third exemplary technique for specifying an audio viewport using the user interface 200. In this example, the user places a hand over the user interface 200, thus covering a portion of the selection viewport 210. In one embodiment, the covered portion can be represented by a circle 226 (shown by a dotted line) defining an audio viewport for the description application 106. Further, by moving the hand over the user interface 200, the user may move the audio viewport to different portions of the selection viewport 210.

Of course, the techniques for specifying an audio viewport described above with reference to FIGS. 2A-2C are intended to be illustrative, and are not limiting of the invention. Other embodiments are broadly contemplated. For example, the user may trace the outline of a shape (e.g., a circle) on the user interface 200 with his fingertip, thus defining the audio viewport as the area within the traced outline. In another example, the user may define and change an audio viewport using interaction devices 160 other than the user interface 200, including keyboard, mice, trackballs, pen tablets, motion-sensitive gloves, proximity-based or motion-based devices, and the like.

In one embodiment, the user interface 200 may be configured to enable the user to navigate (i.e., to move the user's avatar) within the virtual world 130. For example, assume that the user's hand touches the navigation arrow 250 located at the left edge of the user interface 200. In response, the client application 109 may cause the user's avatar to turn left. As a result, the selection viewport 210 will include a portion of the virtual world 130 that is to the left of the portion of the virtual world 130 shown in FIG. 2C. Assume further that the user's hand touches the navigation arrow 255 located at the top edge of the user interface 200. In response, the client application 109 may cause the user's avatar to navigate forward within the virtual world 130. As a result, the selection viewport 210 may change, with the barn 212 filling a larger portion of the selection viewport 210.

In one embodiment, the client application 109 may be configured to allow the user to "zoom" the selection viewport 210, meaning to increase the magnification of the selection viewport 210. Generally, zooming in the selection viewport 210 may appear to have the same effect as moving the user's avatar forward, meaning any elements 132 in front of the user appear to get larger. Note, however, that zooming in the selection viewport 210 only changes the portion of the virtual world 130 presented to the user. In contrast, navigating forward (e.g., by interacting with the navigation arrow 255) actually changes the position of the user's avatar. Once zoomed in, the selection viewport 210 may present additional elements 132 having a finer level of detail (e.g., smaller elements, sub-elements, etc.) than those elements presented prior to zooming in. Further, if the selection viewport 210 is zoomed out, it may present elements 132 having a coarser level of detail (e.g., larger elements).

In one embodiment, the client application 109 may be configured to allow the user to navigate to a position corresponding to a zoomed-in selection viewport 210. For example, assume that the selection viewport 210 is zoomed in at a given magnification, such that the view presented to the user is the same as a view displayed in the selection viewport 210 at regular magnification if the avatar was standing twenty steps in front of the avatar's current position. In this situation, the user may indicate that he wishes to navigate to the position corresponding to the zoomed-in selection viewport 210, thus causing the user's avatar to move forward twenty steps within the virtual world 130. Such a user indication may be, e.g., a user selection of a graphic icon, a command selected from a menu, a gesture performed by touching the user interface 200, and the like.

In one embodiment, the client application 109 may be configured to allow the user to navigate to a position based on matching a selection viewport to an audio viewport. For example, assume that the user's avatar is located at a first position within the virtual world 130, and that the user indicates an audio viewport within the user interface 200. The user may then issue a command to navigate his avatar to a second position based on the indicated audio viewport. That is, the user's avatar will move forward to a second position, such that the selection viewport 210 presented in the second position matches the audio viewport indicated at the first position.

In one embodiment, the description application 106 may be configured to enable the user to determine navigation paths within the audio viewport. That is, the description application 106 may be configured to provide audio output (e.g., voice or sound output) indicating whether an audio viewport selected by the user represents a portion of the virtual world 130 that is unobstructed, and thus the user may navigate in that direction. For example, referring to FIG. 2A, assume the user defines an audio viewport over the tree 216, and that there is a fence between the tree 216 and the user's avatar. In response, the description application 106 may provide audio output indicating that the user cannot navigate in the direction of the tree 216. Assume further that the user then defines a second audio viewport over the barn 212. In response, the description application 106 may provide audio output indicating that the user can navigate in the direction of the barn 212. Note that the description application 106 may provide both navigation information and audio descriptions of elements for a given audio viewport (as described above).

In one embodiment, the client application 109 may be configured to allow the user to navigate to a position based on a selection of an element 132 described by the description application 106. For example, referring to FIG. 2A, assume that the user defines an audio viewport by indicating the rectangle 220. The description application 106 may then present (via the audio output devices 170) a set of audio descriptions of the elements 132 included in rectangle 220, namely "tree," "barn," "horse," etc. The user may select the element "barn" by issuing a selection command (e.g., a keyboard command, a gesture on a touch screen, a voice command, etc.) during (or immediately after) the presentation of the word "barn." In response, the user's avatar may navigate to a second position closer to the barn 212 (i.e., the selected element), such that the barn 212 occupies most (or all) of the selection viewport 210.

In one embodiment, the user interface 200 may be configured to allow the user to control the presentation of the audio descriptions of elements 132 included in the audio viewport. That is, the user may perform indications within the user interface 200 (e.g., gestures, taps, etc.) to stop or pause the presentation of audio descriptions, to select a particular element 132, to zoom in or out, and the like. For example, referring to FIG. 2C, the user may rotate his hand clockwise to speed up the presentation of audio descriptions. In another example, the user may turn his hand counter-clockwise to reverse the presentation to repeat an earlier element 132, and may then tap the user interface 200 to select the repeated element 132.

In one embodiment, the description application 106 may be configured to adjust the level of detail of the audio descriptions based on the amount of time that the user focuses on a given portion of the virtual world 130. For example, referring again to FIG. 2A, assume that the user defines an audio viewport by indicating the rectangle 220, and is thus presented with the audio descriptions of the elements 132 within the audio viewport that have a coarsest level of detail, namely "tree," "barn," "horse," etc. Once the elements 132 of the coarsest level of detail have been described, if the user has not changed the position of the audio viewport, the description application 106 may then present audio descriptions of elements 132 at a next finer level of detail, such as "barn door," "window," "saddle," and the like. This process may be continued down through successive levels of detail, until a finest level of detail of elements 132 is reached. When the finest level of detail is reached, the description application 106 may provide a verbal or sound warning, may repeat the last audio description, or may simply stop providing audio descriptions.

Note that, while the description application 106 is illustrated as a stand-alone application, numerous embodiments are possible. For example, in an alternative embodiment, the description application 106 may be implemented as a web browser and various plug-in applications. In another alternative, the description application 106 may be an integrated component of the client application 109 or the virtual world 130. Thus, embodiments of the description application 106 are not intended to describe a particular hardware and/or software architecture.

Figure 3:
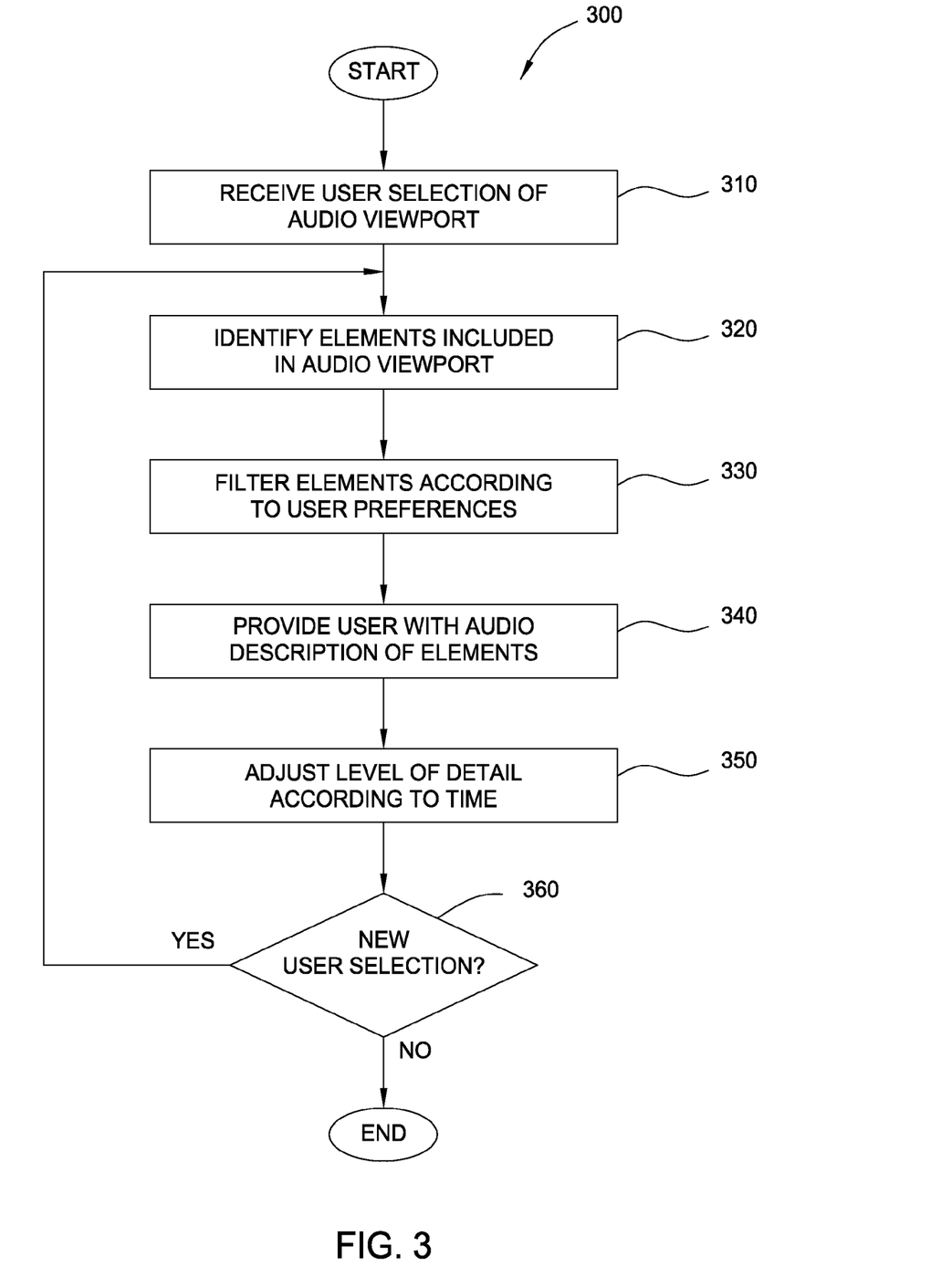
FIG. 3 is a flow diagram illustrating a method, according to one embodiment of the invention.

FIG. 3 is a flow diagram illustrating a method 300 for presenting audio descriptions of elements included in an audio viewport, according to one embodiment of the invention. Specifically, the steps of method 300 may be assumed to be performed by the description application 106 and/or the client application 109 illustrated in FIG. 1. However, persons skilled in the art will understand that any system configured to perform the steps of method 300, in any order, is within the scope of the present invention.

The method 300 begins at step 310, by receiving a user selection of an audio viewport within a virtual world (e.g., virtual world 130 illustrated in FIG. 1). The user selection may be performed by interacting with an interaction device 160 (e.g., using the interactions with user interface 200 illustrated in FIGS. 2A-2C). In one embodiment, the user may select a portion (e.g., rectangle 220) of a larger viewport (e.g., selection viewport 210) to be the audio viewport. At step 320, the elements 132 of the virtual world 130 that are included in the audio viewport may be identified. For example, referring to FIG. 2A, the barn 212, the horse 214 and the tree 316 may be identified as being included in the audio viewport (defined by rectangle 220).

At step 330, the elements 132 included in the audio viewport may be filtered according to user preferences 105. For example, the elements 132 may be filtered according to level of detail, importance or familiarity to the user, quantity of elements, and the like. Optionally, any elements 132 that are partially included within the audio viewport (e.g., the tree 216 shown in FIG. 2A) may be either filtered or not filtered, depending on user preferences 105.

At step 340, the user may be provided with audio descriptions of the unfiltered elements 132 included in the audio viewport. For example, the description application 106 may generate a synthetic voice reading descriptions of the unfiltered elements 132. The audio descriptions may be presented by way of audio devices 170 (e.g., sound cards, voice synthesizers, speakers, etc.). The descriptions may be stored as metadata in element tags 134. At step 350, the level of detail presented in the audio descriptions may be adjusted according to time characteristics. That is, the description application 106 may first describe the elements 132 included in an audio viewport that have a highest level of detail. For example, referring to FIG. 2A, the description application 106 would first describe the barn 212, the horse 214 and the tree 216. Once these elements 132 have been described, if the user has not changed the audio viewport, the description application 106 may then present audio descriptions of elements 132 at a lower level of detail (e.g., "barn door," "window," "saddle," etc.). The descriptions may then continue through lower levels of detail until the audio descriptions reach a lowest level of detail available for the elements 132.

At step 360, it is determined whether the user has specified a new audio viewport. For example, the user may interact with the user interface 200 to indicate a new rectangle 220, thus specifying a new audio viewport. If the user has specified a new audio viewport, the method 300 may return to step 320. However, if the user has not specified a new audio viewport, the method 300 terminates.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
presenting a user with a selection viewport in a user interface, wherein the selection viewport represents a partial view of a virtual environment from a perspective of an avatar present at a first location within the virtual environment, and wherein the virtual environment displays a plurality of elements;
determining, based on an interaction with the user interface, an audio viewport, wherein the audio viewport is a user-defined sub-portion of the selection viewport from which the user can select one or more of the plurality of elements for which audio descriptions are desired;
identifying one or more of the elements included in the audio viewport, wherein each of the identified elements is associated with a predefined audio description;
determining at least one element, of the identified elements, that satisfies one or more predefined user preferences for elements to be described; and
providing the user with the audio description associated with the determined at least one element, wherein the audio description identifies the determined at least one element.

2. The computer-implemented method of claim 1, wherein the one or more predefined user preferences specify whether an element that is partially included within the audio viewport should be described by the provided audio descriptions.

3. The computer-implemented method of claim 1, wherein the user interaction with the user interface comprises touching a touch screen to define a selected sub-portion of the selection viewport.

4. The computer-implemented method of claim 1, wherein the user interface displays a visible image of the selection viewport.

5. The computer-implemented method of claim 1, further comprising:
receiving, within the user interface, a user selection of an element described by the audio descriptions;
determining a second location for the avatar, such that the selection viewport corresponding to the second location would be focused on the selected element;
navigating the avatar to the second location; and
updating the selection viewport according to the perspective of the avatar from the second location.

6. The computer-implemented method of claim 1, further comprising:
receiving, within the user interface, a user command to navigate to a second location within the virtual environment;
navigating the avatar to the second location; and
updating the selection viewport according to the perspective of the avatar from the second location.

7. The computer-implemented method of claim 1, wherein the user preferences specify time-related characteristics of the audio descriptions.

8. The computer-implemented method of claim 1, wherein the audio descriptions are provided to the user according to a hierarchical order of the described elements, such that the level of detail of the audio descriptions is adjusted based on an amount of time that the audio viewport stays focused on an element.

9. A non-transitory computer-readable storage medium including a program, which when executed on a processor performs an operation, the operation comprising:
presenting a user with a selection viewport in a user interface, wherein the selection viewport represents a partial view of a virtual environment from a perspective of an avatar present at a first location within the virtual environment, and wherein the virtual environment displays a plurality of elements;
determining, based on an interaction with the user interface, an audio viewport, wherein the audio viewport is a user-defined sub-portion of the selection viewport from which the user can select one or more of the plurality of elements for which audio descriptions are desired;
identifying one or more of the elements included in the audio viewport, wherein each of the identified elements is associated with a predefined audio description;
determining at least one element, of the identified elements, that satisfies one or more predefined user preferences for elements to be described; and
providing the user with the audio description associated with the determined at least one element, wherein the audio description identifies the determined at least one element.

10. The non-transitory computer-readable storage medium of claim 9, wherein the one or more predefined user preferences specify whether an element that is partially included within the audio viewport should be described by the provided audio descriptions.

11. The non-transitory computer-readable storage medium of claim 9, wherein the user interaction with the user interface comprises touching a touch screen to define a selected sub-portion of the selection viewport.

12. The non-transitory computer-readable storage medium of claim 9, wherein the user interface displays a visible image of the selection viewport.

13. The non-transitory computer-readable storage medium of claim 9, the operation further comprising:
- receiving, within the user interface, a user selection of an element described by the audio descriptions;
- determining a second location for the avatar, such that the selection viewport corresponding to the second location would be focused on the selected element;
- navigating the avatar to the second location; and
- updating the selection viewport according to the perspective of the avatar from the second location.

14. The non-transitory computer-readable storage medium of claim 9, the operation further comprising:
- receiving, within the user interface, a user command to navigate to a second location within the virtual environment;
- navigating the avatar to the second location; and
- updating the selection viewport according to the perspective of the avatar from the second location.

15. The non-transitory computer-readable storage medium of claim 9, wherein the user preferences specify time-related characteristics of the audio descriptions.

16. The non-transitory computer-readable storage medium of claim 9, wherein the audio descriptions are provided to the user according to a hierarchical order of the described elements, such that the level of detail of the audio descriptions is adjusted based on an amount of time that the audio viewport stays focused on an element.

17. A system, comprising:
- a database;
- a processor; and
- a memory containing a program, which when executed by the processor is configured to perform an operation, the operation comprising:
  - presenting a user with a selection viewport in a user interface, wherein the selection viewport represents a partial view of a virtual environment from a perspective of an avatar present at a first location within the virtual environment, and wherein the virtual environment displays a plurality of elements;
  - determining, based on an interaction with the user interface, an audio viewport, wherein the audio viewport is a user-defined sub-portion of the selection viewport from which the user can select one or more of the plurality of elements for which audio descriptions are desired;
  - identifying one or more of the elements included in the audio viewport, wherein each of the identified elements is associated with a predefined audio description;
  - determining at least one element, of the identified elements, that satisfies one or more predefined user preferences for elements to be described; and
  - providing the user with the audio description associated with the determined at least one element, wherein the audio description identifies the determined at least one element.

18. The system of claim 17, wherein the one or more predefined user preferences specify whether an element that is partially included within the audio viewport should be described by the provided audio descriptions.

19. The system of claim 17, wherein the user interaction with the user interface comprises touching a touch screen to define a selected sub-portion of the selection viewport.

20. The system of claim 17, wherein the user interface displays a visible image of the selection viewport.

21. The system of claim 17, wherein the user preferences specify time-related characteristics of the audio descriptions.

* * * * *